United States Patent [19]
Lal et al.

[11] Patent Number: 5,714,044
[45] Date of Patent: Feb. 3, 1998

[54] METHOD FOR FORMING A THIN CARBON OVERCOAT IN A MAGNETIC RECORDING MEDIUM

[75] Inventors: Brij Bihari Lal; Allen J. Bourez, both of San Jose; Michael A. Russak, Los Gatos, all of Calif.

[73] Assignee: HMT Technology Corporation, Fremont, Calif.

[21] Appl. No.: 511,729

[22] Filed: Aug. 7, 1995

[51] Int. Cl.$^6$ .................................................. C23C 14/34
[52] U.S. Cl. .................. 204/192.16; 204/192.15; 204/192.2
[58] Field of Search ............... 204/192.12, 192.15, 204/192.16, 192.2, 298.26

[56] References Cited

U.S. PATENT DOCUMENTS

| | | | |
|---|---|---|---|
| 4,631,202 | 12/1986 | Opfer et al. | 427/131 |
| 4,880,515 | 11/1989 | Yoshikawa et al. | 204/298.19 X |
| 5,022,978 | 6/1991 | Hensel et al. | 204/298.19 |
| 5,110,679 | 5/1992 | Haller et al. | 204/192.16 X |
| 5,174,880 | 12/1992 | Bourez et al. | 204/298.19 X |
| 5,244,554 | 9/1993 | Yamagata et al. | 204/192.16 X |
| 5,366,607 | 11/1994 | Lal et al. | 204/298.19 |
| 5,453,168 | 9/1995 | Nelson et al. | 204/192.2 X |
| 5,556,519 | 9/1996 | Teer | 204/192.12 |

FOREIGN PATENT DOCUMENTS 12227220  9/1989  Japan.

OTHER PUBLICATIONS

U.S. application No. 08/615,728, Lal et al., filed Mar. 14, 1996.

*Primary Examiner*—Nam Nguyen
*Attorney, Agent, or Firm*—Judy M. Mohr; Peter J. Dehlinger

[57] ABSTRACT

A method for forming an overcoat having first and second layers in a magnetic recording medium is described. The first overcoat layer is deposited in a first sputtering chamber where the magnetic means for confining target plasma in the chamber are oriented to retain magnetic-field confinement about the target surface and to produce magnetic field lines between directly confronting portions of the confronting sputtering targets. The second overcoat layer is deposited under a nitrogen-containing atmosphere.

8 Claims, 11 Drawing Sheets

Number of Cycles

Number of Cycles

Number of Cycles

Number of Cycles

Number of Cycles

Number of Cycles

Number of Cycles

Number of Cycles

METHOD FOR FORMING A THIN CARBON OVERCOAT IN A MAGNETIC RECORDING MEDIUM

FIELD OF THE INVENTION

The present invention relates to a method for forming a two-layer overcoat in a magnetic recording medium by sputtering the lower overcoat layer with the magnetic poles of a cathode assembly oriented to produce a magnetic field both across the target surfaces and between directly confronting portions of the targets. The second overcoat layer is sputtered under a nitrogen-containing atmosphere.

BACKGROUND OF THE INVENTION

Cathode sputtering is widely used for depositing thin films of material onto substrates. The process involves vaporizing a material by ion bombardment of a target which forms part of a cathode assembly in an evacuated chamber containing an inert gas such as argon. A high voltage electric field is applied between the cathode assembly and an anode in the chamber, and the gas is ionized by collision with electrons ejected from the surface of the cathode. The positive gas ions are attracted to the cathode surface, and atoms of material dislodge when the ions strike the target, traverse the enclosure and deposit as a thin film onto a substrate positioned on a support maintained at or near anode potential.

Although the sputtering process can be carried out solely in an electric field, substantially increased deposition rates are possible with magnetron sputtering in which an arched magnetic field, formed in a closed loop over the surface of the sputtering target, is superimposed on the electric field. The arched closed loop magnetic field traps electrons in an annular region adjacent to the surface of the target, thereby multiplying the collisions between electrons and gas atoms to produce a corresponding increase in the number of ions in that region.

In a typical magnetic recording medium, an overcoat is deposited by DC-magnetron sputtering to protect the underlying magnetic recording layer from damage and wear. Repeated contact between the disc and the read-write head used in accessing the disc can cause damage and\or wear to the medium.

Ideally, the carbon overcoat has a high degree of hardness or erosion-resistance to provide maximum protection against wear and, at the same time, is as thin as possible to allow for high density recording. A thin overcoat allows the head to fly closer to the magnetic film layer in a recording medium, which leads to improved magnetic recording properties, particularly $PW_{50}$, overwrite, and resolution properties. However, thin overcoats, e.g., less than about 200 Å, often do not provide adequate protection against wear and damage.

SUMMARY OF THE INVENTION

The invention includes a method for forming an overcoat having first and second layers in a magnetic recording medium. The method, which is effective to enhance the stiction/friction properties of the medium, includes sputtering the first overcoat layer in a first sputtering chamber having two confronting targets, each target having a magnetic means for confining target plasma during sputtering. The magnetic means are oriented to retain magnetic-field confinement of the sputtering plasma and to produce magnetic field lines between directly confronting portions of the two targets. The second overcoat layer is sputtered under a nitrogen-containing atmosphere.

In one embodiment, the second overcoat sputtering occurs in a second sputtering chamber, where the magnetic means are oriented to retain magnetic-field confinement of the sputtering plasma.

In another embodiment, the second overcoat sputtering occurs in the first sputtering chamber with the magnetic means oriented to retain magnetic-field confinement of the sputtering plasma, and to produce magnetic field lines between directly confronting portions of the two targets.

The magnetic means are electromagnets, in one embodiment, where in the first chamber the electromagnets have magnetic poles on opposite side regions of an associated target, with the polarity of each pole being opposite in the directly confronting target portion. In this embodiment, the electromagnets have a coil current between 2–5 Amps.

In another embodiment, the magnetic means are permanent magnets.

In one embodiment, the targets are each composed of carbon and the nitrogen-containing sputtering atmosphere is composed of 5–50 atomic percent nitrogen and 50–95 atomic percent argon.

The sputtering steps of the method of the invention are effective to deposit an overcoat having a thickness between 80–250 Å.

DETAILED DESCRIPTION OF THE INVENTION

Sections I and II below describe a sputter cathode assembly and preparation of a thin-film recording medium having a two layer overcoat, in accordance with the method of the invention. Section III describes the contact start\stop and friction coefficient properties of recording media formed in accordance with the invention and, for comparison, formed conventionally.

I. SPUTTER CATHODE ASSEMBLY

Figure 1:
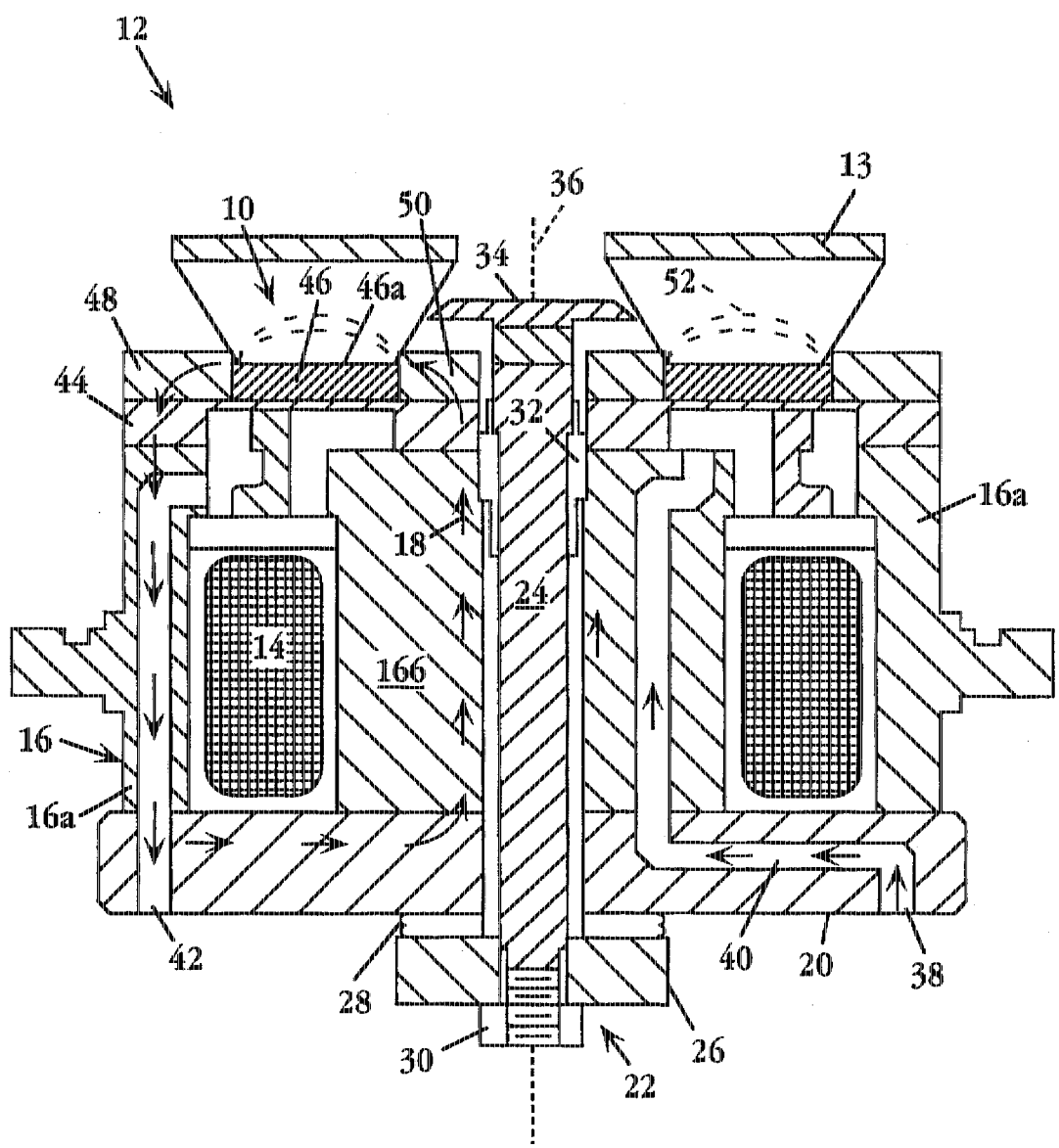
FIG. 1 is a cross sectional view of a sputter cathode assembly.

FIG. 1 shows in cross section an annular target assembly, shown generally at 10, that forms part of a cathode assembly 12 of a sputtering apparatus for use in forming a thin-film recording medium having an overcoat. It will be appreciated that a similar cathode assembly may be positioned "above" assembly 12 for sputtering a desired film onto the upper and lower sides of a substrate 13 positioned between the confronting target assemblies.

Assembly 12 also includes an electromagnetic coil assembly 14 housed in a pole weldment 16 for conducting flux generally along a path 18 represented by the short dashed arrows, around the coil assembly, when the coil assembly is energized. Pole weldment 16, driven by coil assembly 14, forms a source of magnetic field for use with target assembly 10. Magnetic flux of a first direction exists in the outer cylindrical portion 16a of the pole weldment, with the flux path completed by a corresponding smaller-diameter cylindrical inner portion 16b adjacent the anode post.

A rear pole 20 caps the pole weldment and is held in place by an anode assembly 22. Assembly 22 includes an anode post 24 secured with an anode cooler plate 26 and an anode insulating washer 28 by a nut 30 threaded onto the end of the anode post, as shown.

An anode insulating seal 32 supports the opposite end of the anode post, which terminates in an exposed circular disk-shaped anode cap 34. The anode post and cap are symmetrical about the target center, represented by axis 36.

The cathode assembly is cooled by water which enters through inlet channel 38 and travels in channel 40 around a cavity about the target assembly and out an outlet channel 42.

The target assembly 10 includes an annular backing plate 44 and a sputtering target 46. Target 46 is attached to the backing plate by inner and outer annular ferromagnetic ring spacers or clamps 48, 50. The target is formed of a desired sputtering material for use as a sputtering target by conventional metallurgical methods.

As discussed above, the electromagnetic coil assembly, also referred to herein as magnetic means, is a source of magnetic flux for use with the target assembly. The electromagnetic assembly, or other magnetic flux producing assembly, is adjacent the backing plate and has poles, such as a north pole and a south pole.

The poles of the magnetic means are oriented to produce a magnetic field 52 which emerges from the target face over one pole, bends over, and re-enters the target again over the opposite pole. Thus, a "tunnel-shaped" magnetic field is established over the target surface 46a. This field is a closed loop and defines the so-called target racetrack and serves to confine the sputtering plasma to a defined region about the target surface for deposition of material onto substrate 13.

It will be appreciated that in a sputtering apparatus, there is a confronting cathode assembly positioned "above" the substrate for sputtering material onto both sides of the substrate. The magnets of the confronting assembly are also oriented to produce a tunnel-shaped magnetic field about the target surface for confining sputtering plasma to the target surface. Thus, confronting magnetic poles have the same polarity. This arrangement of magnetic means in a cathode assembly is referred to herein as "symmetric" or "conventional".

Figure 2:
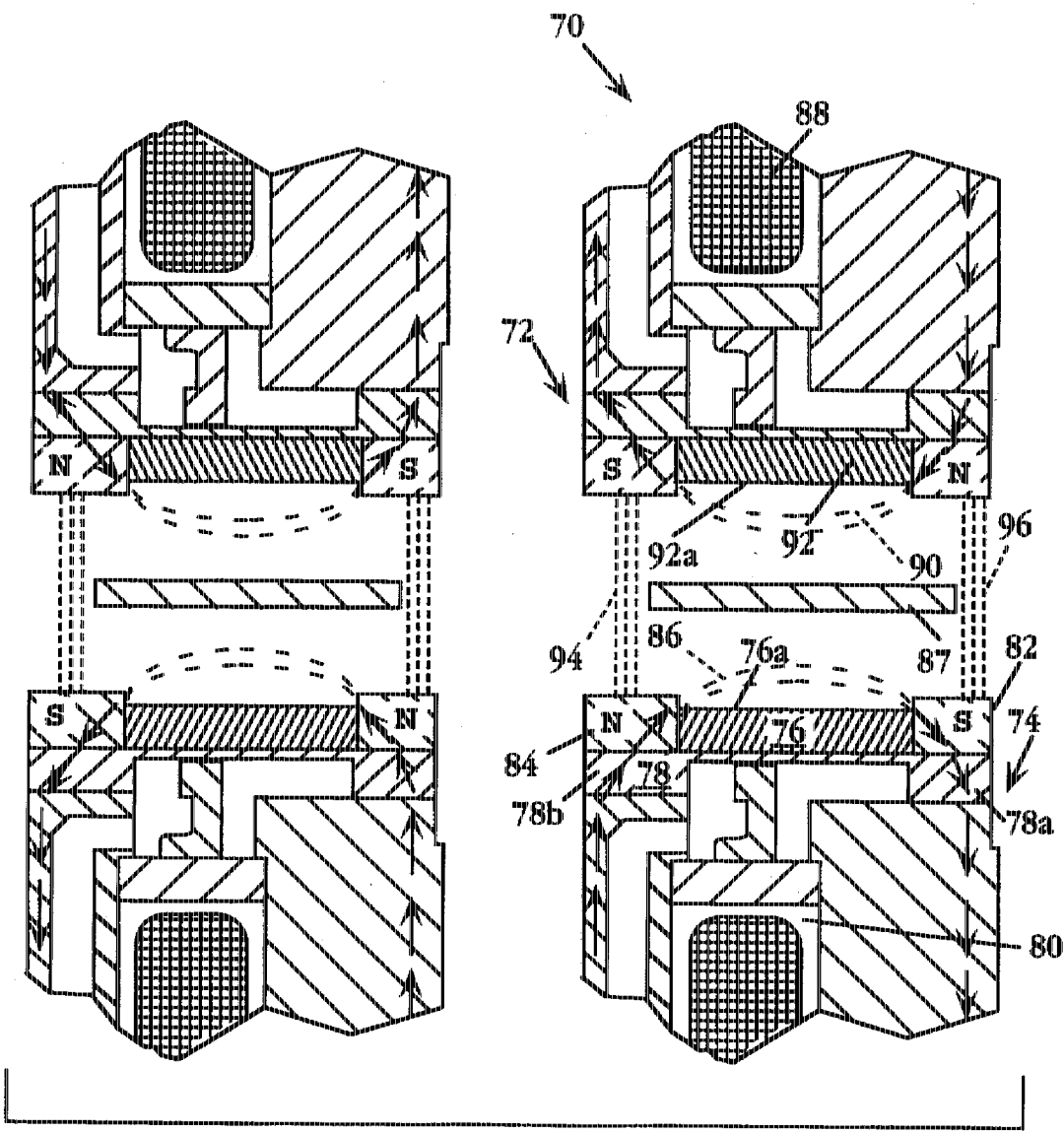
FIG. 2 is an enlarged cross sectional view of a target assembly showing the distribution of magnetic field lines.

Turning now to FIG. 2, a sputtering assembly 70, having confronting cathode assembly portions 72, 74, that are similar to that described in FIG. 1, is shown in cross section. It will be appreciated that confronting portions 72, 74 are composed of similar elements.

Portion 74 includes a sputtering target 76, a backing plate or support member 78 and a magnetic means, shown here as an electromagnetic assembly 80. The magnetic means may also be one or more permanent magnets, as will be described in FIG. 3B. Sputtering target 76 has an upper exposed or sputtering surface 76a. The target is made of a conventional sputtering material, such as those described below.

Target 76 is secured to the backing plate by a clamping means, shown adjacent outer portion 78a and inner portion 78b of the backing plate as clamps 82, 84. These clamps are made of a suitable ferromagnetic material, such as 410 stainless steel, which is relatively transparent to magnetic flux lines from the magnetic poles in the assembly.

The backing plate may optionally have an annular shunt portion extending from about the middle of the backing plate for conducting magnetic flux and distributing magnetic flux over the target surface, as described in co-owned U.S. Pat. No. 5,174,880.

Magnetic means 76 is adjacent the backing plate and has magnetic poles, designated in FIG. 2 according to convention as N and S. Magnetic field lines 86, indicated in a N to S direction according to convention, emerge from the target face over one pole, bend over, and re-enter the target again over the opposite pole. A closed tunnel magnetic field is thus produced that concentrates or confines the sputtering plasma to the region about the target surface 76a for deposition of material on substrate 87.

Confronting portion 72 of the assembly also has a magnetic means 88 having opposing pole members, designated as N and S, which produce a magnetic flux 90 about the target surface 92a of target 92. The sputtering plasma is confined to the region about the target surface by the closed tunnel magnetic field 90.

According to an important aspect of the present invention, it has been discovered that orienting the magnetic means 80, 88 such that directly confronting poles are of opposite polarity results in improved stiction/friction properties of a two-layer overcoat prepared with the magnetic means so configured during deposition of at least one of the overcoat layers. This arrangement of magnetic means is referred to herein as "asymmetric".

With continued reference to FIG. 2, magnetic field lines 94, 96 are produced between directly confronting portions of the two targets. At the same time, the magnetic fields 86, 90 across the target surface are retained.

Figure 3A:
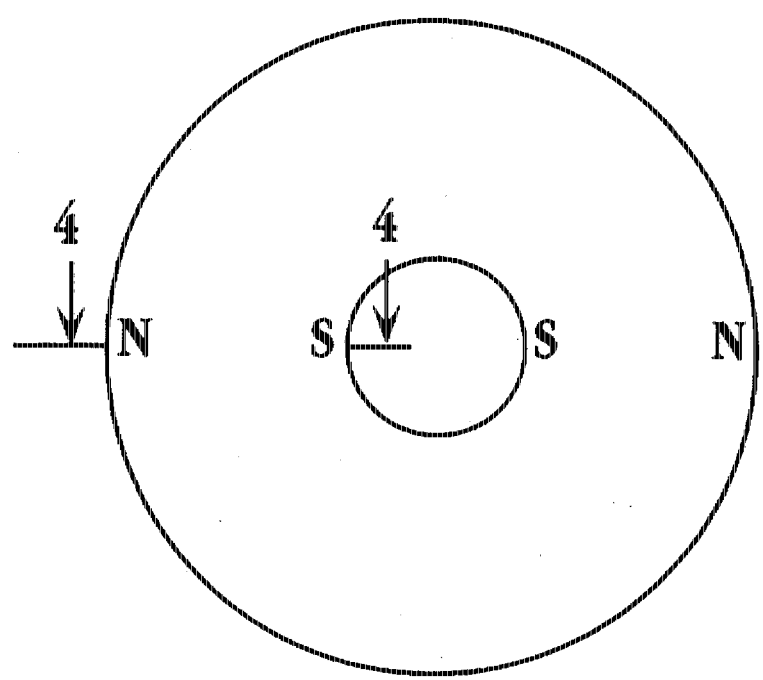
FIGS. 3A–3B are plan views of the cathode assembly, where the magnetic means is an annular ring (FIG. 3A) or a series of bar magnets (FIG. 3B)
Figure 3B:
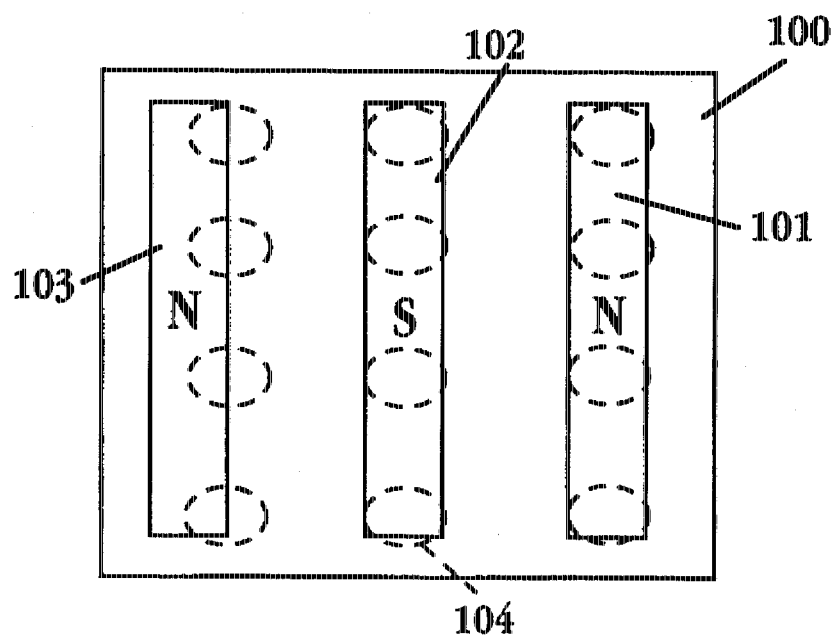

As discussed above, the magnetic poles of the cathode assembly may be of an electromagnet or a permanent magnet. FIGS. 3A and 3B show two possible geometric shapes of the magnetic means. FIG. 3A is a plan view of an annular magnetic ring having one magnetic pole about the outer diameter of the magnet, designated as N, and an opposite magnetic pole about the inner diameter, designated as S. FIG. 3B is a plan view of a target 100 with a series of elongate magnetic bars, 101, 102, 103 positioned adjacent the target. The elongate bars, having a polarity designated as N and S, are arranged to produce a magnetic field across the target surface for confining sputtering plasma to the target surface area for deposition of material onto the substrates, such as substrate 104, positioned below the target. Typically, these bars are permanent magnets and form a "Mag-Pak" for use with a rectangular target for sputtering a plurality of discs arranged on a pallet.

Figure 4:
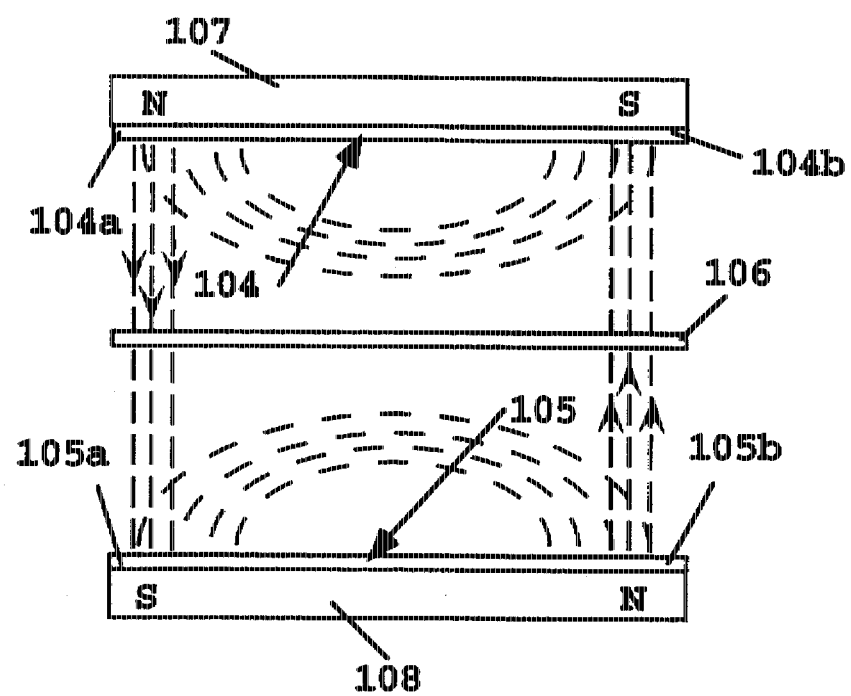
FIG. 4 shows in cross section a two-pole cathode assembly.
Figure 5:
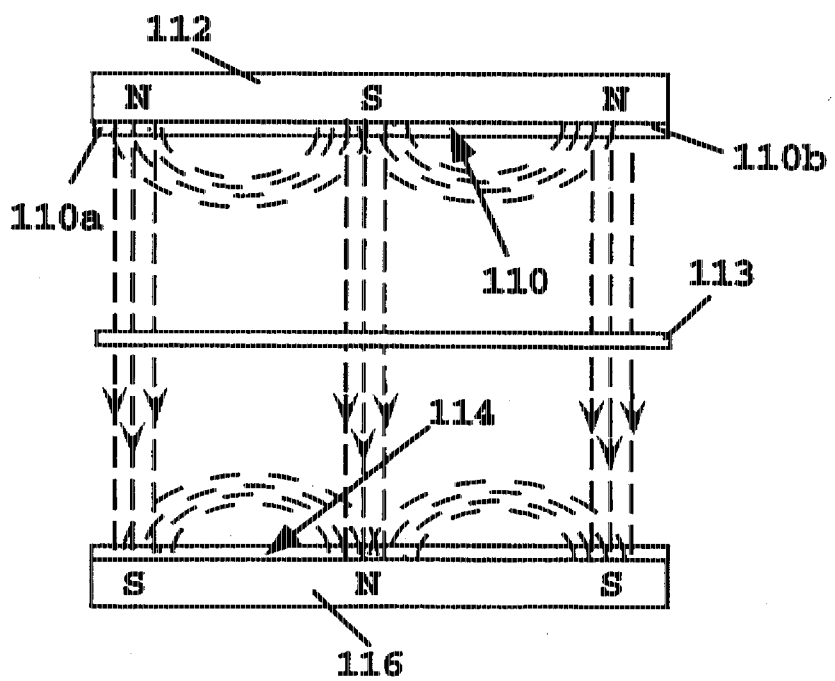
FIG. 5 shows in cross section a three-pole cathode assembly.

In one general embodiment of the invention, the magnetic means have poles on opposite side regions of an associated target, with the polarity of each pole being opposite in the directly confronting target portion. This embodiment is illustrated in FIGS. 4 and 5, where FIG. 4 shows a two-pole arrangement and FIG. 5 a three-pole arrangement. FIGS. 4 and 5 are cross sectional views of a cathode assembly and are representative of either an annular assembly, taken along line 4—4 in FIG. 3A, or a rectangular assembly, taken as an end view of FIG. 3B.

Seen in FIG. 4 are confronting sputtering targets 104, 105 each having an associated magnetic means 107, 108, respectively. The confronting targets, each having a target surface, define a station for receiving a substrate 106 between the two targets. In this embodiment, the magnetic means are electromagnets, but it will be appreciated that permanent magnets are also suitable. Electromagnets 107, 108 have magnetic poles, designated in FIG. 4 as "N" and "S", on opposite side regions of their respectively associated targets. Also, side region 104a on target 104 is adjacent magnetic pole "N" and the directly confronting target portion 105a is associated with magnetic pole of opposite polarity, designated "S". Thus, magnetic field lines are produced between directly confronting target portions 104a, 105a and 104b, 105b and the magnetic flux across the target surface is retained.

FIG. 5 illustrates an asymmetric three-pole arrangement where the magnetic poles are arranged with the same polarity poles on opposite sides of a target. A station for receiving a substrate, such as substrate 113, is defined between the target surfaces. Target 110, having opposite sides 110a and 110b, is associated with magnetic means 112. The magnetic poles of magnetic means 112, designated in FIG. 5 as "N" and "S", are arranged such that the poles on opposite sides, 110a, 110b, of the target are the same. This arrangement is also seen in the directly confronting target 114, associated with magnetic means 116. The magnetic means 112, 116 are arranged asymmetrically such that the magnetic poles of directly confronting target portions are of opposite polarity.

The asymmetric arrangement of magnetic means, illustrated in FIGS. 4 and 5, retains the magnetic field across the target surface while producing a magnetic field between directly confronting portions of the two targets.

II. OVERCOAT FORMATION

The overcoat in a thin-film recording medium is prepared in accordance with the present invention as follows. Confronting portions of the cathode assembly described above define a station for receiving a substrate for sputter deposition from the targets. A substrate or a pallet containing a plurality of disc substrates is positioned between confronting cathode assemblies for sputter deposition. The first overcoat layer is deposited with the magnetic means of the cathode assembly arranged asymmetrically. The second overcoat layer is sputtered under a nitrogen-containing atmosphere, and, according to one embodiment of the invention, in a second sputtering chamber where the magnetic means are oriented conventionally. In another embodiment, the second overcoat layer is sputtered in the first sputtering chamber, with the magnetic means oriented asymmetrically, and in the presence of nitrogen. These embodiments are described in more detail below.

Figure 6:
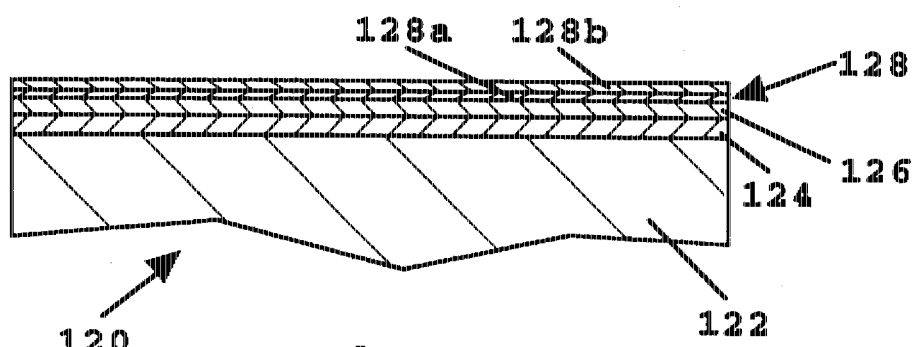
FIG. 6 is a cross-sectional view of a thin-film magnetic media formed in accordance with one embodiment of the invention.

A medium having an overcoat formed in accordance with the first embodiment of the invention is shown in FIG. 6. Seen here in cross sectional view is a fragmentary portion of a thin-film medium 120 composed of a rigid disk-like substrate 122, and forming successive thin-film layers over the substrate, a crystalline underlayer 124, a magnetic thin-film layer 126, and an overcoat 128. Overcoat 128 is composed of a first layer 128a and a second layer 128b, prepared as described below.

The substrate may be a metallic material, such as a conventional surface-coated, textured aluminum substrate of the type used commonly for digital recording medium. The substrate may also be a non-metallic material such as textured glass, ceramic, glass-ceramic, carbon, silicon nitride, silicon carbide or a heat-resistant polymer.

Suitable types of glass include soda-lime and aluminosilicate glasses. One preferred substrate is an aluminosilicate glass substrate having a highly polished surface, a thickness of about 0.025 inch, and a diameter of 1.8 inches (48 mm). Smooth-surfaced substrates of this type are commercially available from Hoya (Japan), NSG (Japan), and Pilkington (U.K.). Ceramic materials which are suitable for substrates in the invention include Canasite™ manufactured by Corning Glass and crystallized glass manufactured by Ohara (Japan) and Yamamura (Japan).

The surface of the substrate is textured, yet is sufficiently smooth for acceptable flying head height and friction during contact-start-stop.

The underlayer is preferably crystalline and formed of a chromium-based material, that is the underlayer may be formed of chromium or of a chromium-based alloy, such as Cr—Si, Cr—V, Cr—Gd, or Cr—Ti. The underlayer is sputtered to a thickness between about 200–3,000 Å.

The magnetic film layer 126 is preferably a cobalt-based alloy which is formed on the underlayer by sputtering or the like to a desired thickness, preferably between 100–800 Å. By cobalt-based alloy is meant an alloy containing at least 50% cobalt. Exemplary binary alloys include Co/Cr or Co/Ni, and exemplary ternary, quaternary, and five-element alloys include Co/Cr/Ta, Co/Ni/Pt, Co/Ni/Cr, Co/Cr/Ta/Pt, Co/Ni/Cr/Pt, and Co/Cr/Ni/Pt/B. A preferred cobalt-based alloy is composed of 80–90% cobalt, 5–20% chromium and 2–10% tantalum. Most preferred alloys include 84.5% cobalt, 12.5% chromium, 3.0% tantalum and 88% cobalt, 8% chromium and 4% tantalum.

The thin-film magnetic layer may also be a multilayer structure composed of two or more magnetic thin-film sublayers, each separated by a thin isolation layer, such as a 2–50 Å chromium isolation layer.

Overcoat 128 is formed by sputter deposition onto the magnetic recording layer. The overcoat may be composed of carbon, silicon oxide, silicon nitride, or other suitable material giving wear-resistant, protective properties to the medium. Preferably, the overcoat is formed of carbon and has a thickness between 80–250 Å where the first overcoat layer is between 20–80 Å and the second overcoat layer is between 30–260 Å.

Overcoat 128 is formed in a sputtering apparatus having a series of sputtering chambers, such as those commercially available from various sources, such as Circuits Processing Apparatus (Fremont, Calif.), Leybald Heraeus (Germany), VACTEK (Boulder, Colo.), Materials Research Corp (Albany, N.Y.), Varian/Intevac (Santa Clara, Calif.), ULVAC (Japan), or Anelva (Japan). These systems are all double-sided, in-line, high-throughput machines having two interlocking chambers for loading and unloading.

Figure 7A:
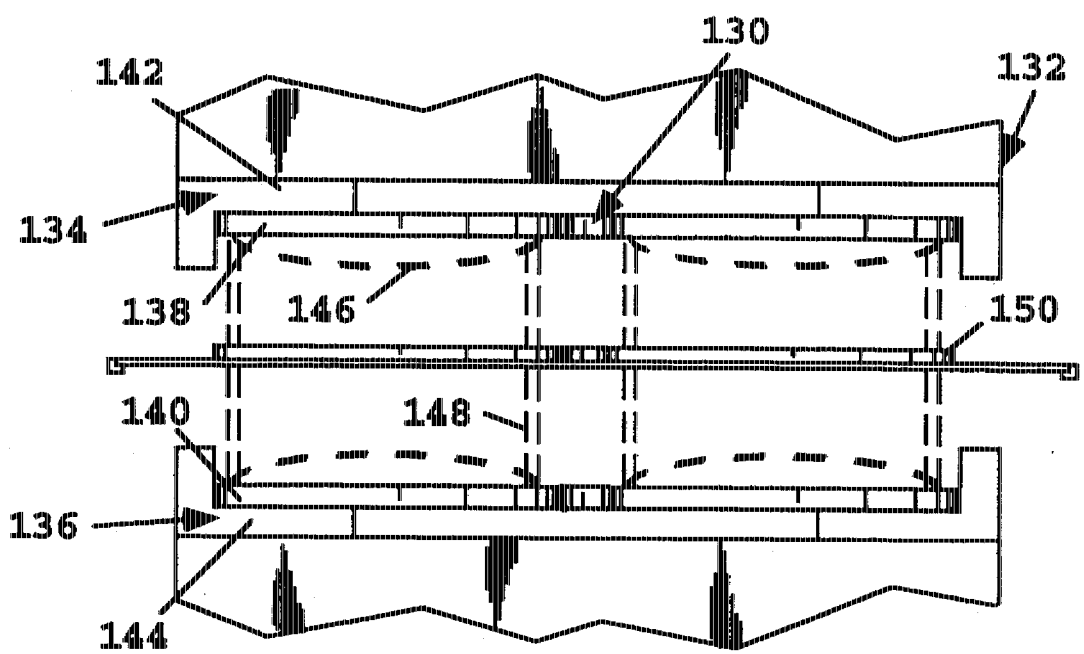
FIGS. 7A–7B are schematic views of a sputtering apparatus used in producing the thin-film medium of FIG. 6, in accordance with one embodiment of the invention.
Figure 7B:
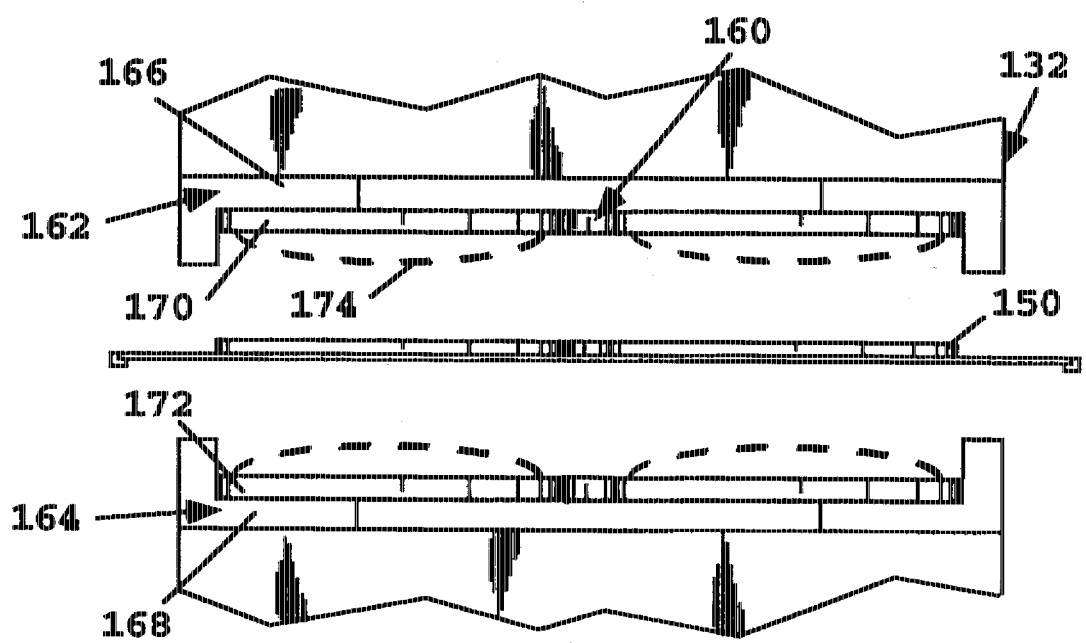

FIGS. 7A and 7B show adjacent sputtering chambers in a sputtering apparatus for forming the two-layer overcoat, such as overcoat 128, in accordance with one embodiment of the invention. Sputtering chamber 130 of sputtering apparatus 132 includes confronting cathode assemblies 134, 136. Targets 138, 140, associated with cathode assemblies 134, 136, respectively, each have a magnetic means 142, 144, for confining target plasma during sputter deposition.

The first overcoat layer, such as layer 128a of overcoat 128 in FIG. 6, is sputtered under an atmosphere of argon and with magnetic means 142, 144 oriented asymmetrically. That is, the magnetic means are oriented to produce a magnetic field about the target surface, as represented by dashed lines 146. Magnetic field 146 serves to concentrate or confine the sputtering plasma to the region about the target surface. At the same time, the asymmetric orientation of the magnetic means produces magnetic field lines between directly confronting targets, as indicated by dashed lines 148. Preferably, the magnetic means are electromagnets, operated at a coil current of between 2–5 amps.

The first carbon overcoat layer is deposited onto a substrate, such as substrate 150, positioned between confronting targets 138, 144. Deposition continues until the first carbon overcoat layer is at the desired thickness of between about 20 to 80 Å.

The substrate, or pallet of substrates, is shuttled downstream in apparatus 130, to a sputtering station for deposition of the second overcoat layer. FIG. 7B shows a second sputtering chamber 160 for deposition of the second overcoat layer, such as layer 128b in overcoat 128 of FIG. 6. Chamber 160, like chamber 130 of FIG. 7A, includes confronting cathode assemblies 162, 164, having magnetic means 166, 168 and targets 170, 172. Magnetic means 166, 168 in chamber 160 are oriented conventionally, that is to produce magnetic field lines, indicated by dashed lines 174, about the target surfaces to retain sputtering plasma to the region about the target surfaces.

According to an important feature of the invention, the second overcoat layer is deposited under a sputtering atmosphere that contains nitrogen. The atmosphere of sputtering chamber 160 is isolated from adjacent sputtering chambers, such as upstream chamber 130, by a series of pressure locks and valves. Nitrogen and argon are introduced into the sputtering chamber from gas sources external to the sputtering chamber. The desired atomic percentages of gases in the chamber may be controlled by suitable valving apparatus (not shown) which controls the flow rate at which gases are introduced into the chamber. Alternatively, the desired gas may be premixed and admitted to the sputtering chamber from a single mixed-gas source.

For formation of the second, nitrogen-containing overcoat layer, the sputtering atmosphere contains between 5–50 atomic percent nitrogen gas, i.e., the atoms of $N_2$ introduced into the chamber represent between 5 and 50 atomic percent of the total gas molecules in the chamber. The balance of gas is an inert sputtering gas, such as argon.

The second overcoat layer is preferably formed under sputtering conditions which yield a final thickness of between about 30 to 160 Å.

Figure 8:
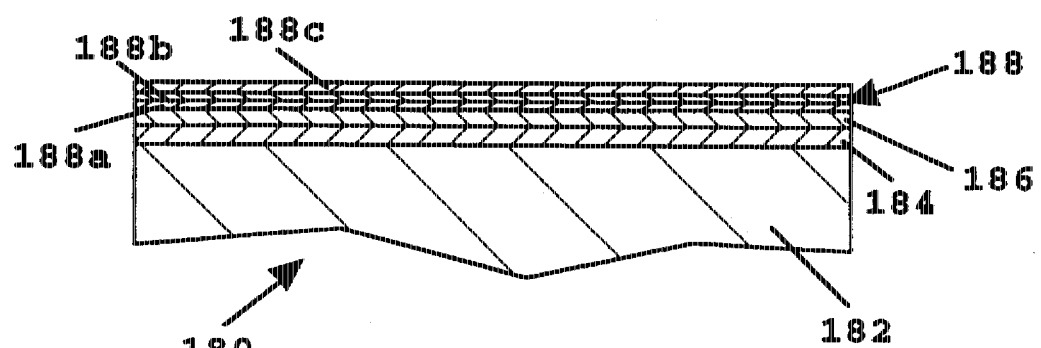
FIG. 8 is a cross-sectional view of a thin-film medium formed in accordance with a second embodiment of the invention.

In accordance with a second embodiment of the invention, the two-layer overcoat is formed in a single sputtering chamber in a two-step sputtering process. FIG. 8 is a cross-sectional view of a magnetic medium formed, according to this embodiment, in a single sputtering chamber. Medium 180 includes a substrate 182, metal or non-metallic, with a crystalline underlayer 184. A magnetic thin-film layer 186 is deposited over the underlayer and is formed of a magnetic alloy, such as those listed above. Overcoat 188, deposited directly on the magnetic thin-film layer, includes a first overcoat layer 188a immediately adjacent magnetic layer 186 and a second overcoat layer 188c. An intermediate layer or gradient layer 188b is disposed between layer 188a, 188b and is formed as will be described below.

Figure 9:
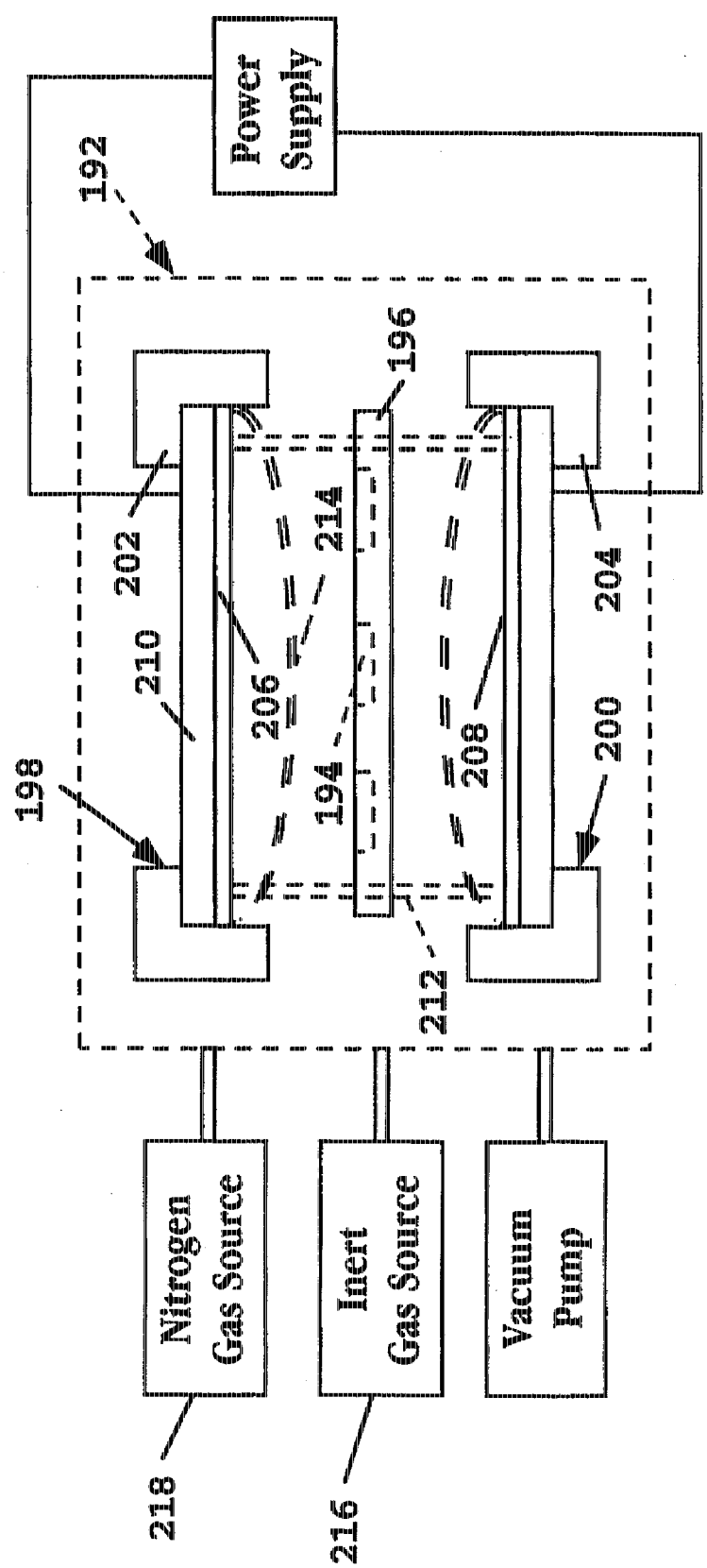
FIG. 9 is a schematic view of a sputtering apparatus used in producing the thin-film medium of FIG. 8, in accordance with a second embodiment of the invention.

FIG. 9 shows in schematic view, a portion of a sputtering apparatus 190 which includes a sputtering chamber 192. Sputtering apparatus 190 may include other sputtering chambers upstream or downstream of chamber 192 at which other sputtering or heating operations occur. Alternatively, apparatus 190 may include a single sputtering chamber. A substrate, such as substrate 194 is carried into the chamber on a tray or pallet 196. The substrates on the tray are supported on the tray for sputtering on both sides of the substrates, as shown.

Sputtering chamber 192 includes confronting cathode assemblies, 198, 200. Each cathode assembly includes a magnetic means 202, 204 and a sputtering target 206, 208, for target deposition on upper and lower sides of the substrates in the figure, respectively. Target 206, which is representative, is supported on an electrically conductive backing plate 210 which is electrically insulated from the chamber.

Magnetic means 202, 204 are oriented asymmetrically, with magnetic poles on opposite side regions of an associated target having opposing polarity and with the polarity of each pole being opposite in a directly confronting target portion. This arrangement produces magnetic field lines between directly confronting portions of opposed targets, as indicated by dashed lines 212, while retaining the magnetic field created across the target surface, indicated by dashed lines 214. It will be appreciated that the magnetic poles may be associated with permanent or electromagnets.

In a sputtering operation for deposition of the overcoat, in accordance with this embodiment of the invention, the first layer of the overcoat is deposited by sputtering from targets 206, 208 under an inert, e.g., argon, atmosphere supplied by means of suitable valving (not shown in FIG. 9) from inert gas supply 216. The magnetic means are arranged asymmetrically, as described above. The first overcoat layer is deposited to a thickness of between about 20 and 80 Å.

After deposition of the first overcoat layer, nitrogen, or a nitrogen-containing gas, is introduced into the sputtering chamber from a nitrogen gas supply 218. Nitrogen is introduced into the chamber to produce a sputtering atmosphere that contains between 5–50 atomic percent nitrogen gas, with the balance argon or other inert gas.

Deposition of an intermediate overcoat layer, such as layer 188b shown in FIG. 8, is deposited on the first overcoat layer as the sputtering atmosphere changes from pure argon to the desired nitrogen:argon composition. The composition of the intermediate layer will reflect the changing sputtering environment, progressing from deposition of carbon to a mixture of nitrogen and carbon.

When the atmosphere of the sputtering chamber reaches the desired nitrogen:argon composition, the second overcoat layer is deposited to the desired thickness, preferably, between 30 to 160 Å. The magnetic means of the cathode assembly in the sputtering chamber remain oriented asymmetrically for the deposition of the first, intermediate and second overcoat layers.

III. PROPERTIES OF THE MAGNETIC RECORDING MEDIUM

Section IIIA describes the contact start\stop and the friction coefficient properties of media having a two-layered overcoat, where each layer of the overcoat was deposited in a separate sputtering chamber. In the first sputtering chamber, the magnetic means of the cathode assembly were arranged in an asymmetric configuration, such that a magnetic field across each target surface is retained and a magnetic field between confronting targets is produced. In the second sputtering chamber, the magnetic means were arranged symmetrically, such that a magnetic field across the target surface is present. During the second sputtering step, nitrogen was introduced into the sputtering chamber at a concentration of 40 volume percent, with the balance argon.

In Section IIIB, the friction coefficient and contact start\stop properties are shown for media formed with a two-layer overcoat deposited in a single sputtering chamber. The magnetic means in the sputtering chamber were oriented asymmetrically for deposition of the first and second overcoat layers. During deposition of the first layer, the sputtering chamber atmosphere was composed of pure argon and deposition of the second overcoat layer was under a nitrogen-containing atmosphere. For comparison, media having an overcoat formed under the same sputtering atmospheres, but with the magnetic means oriented symmetrically, were prepared.

A. Overcoat Formed in Two Chamber Process

Magnetic recording media were prepared on a nickel/phosphorus plated aluminum substrate with a chromium underlayer and a cobalt-based magnetic recording layer, as described in Example 1A. The first layer of the carbon overcoat was deposited directly on the magnetic recording layer in a first sputtering chamber where the magnetic means were arranged asymmetrically and under a sputtering atmosphere of argon. The second overcoat layer was deposited in a second sputtering chamber with the magnetic means arranged symmetrically and under a sputtering atmosphere of 40 atomic percent nitrogen, balance argon.

For comparison, similar media were formed, as described in Example 2A, except with an overcoat deposited with the magnetic means arranged symmetrically in both sputtering chambers.

The lubricity properties of discs are generally measured in terms of dynamic and/or static coefficients of friction. Dynamic friction coefficients are typically measured using a standard drag test in which the drag produced by contact of a read/write head with a disc is determined at a constant spin rate, e.g., 1 rpm. It is desirable, for good long-term disc and drive performance, is that the disc retain a relatively low coefficient of friction after many start/stop cycles or contacts with a read/write head.

Static coefficients of friction (stiction values) are typically measured using a standard contact start-stop (CSS) test in which the peak level of friction is measured as the disc starts rotating from zero to a selected revolution rate (e.g., to 5000 rpm). After peak friction has been measured, the disc is brought to rest, and the start-stop process is repeated for a selected number of start-stop cycles (e.g., 20,000 cycles). As used herein, enhancing the stiction/friction properties of a medium refers to an improvement of at least 10% in the coefficient of friction.

Table 1 compares the coefficient of friction of media formed in accordance with the invention (Example 1A) and with comparative or control media formed with the magnetic means arranged symmetrically in both the first and second sputtering chambers (Example 2A). These measurements were conducted under ambient conditions (21° C. and about 45% humidity).

TABLE 1

| Overcoat | Coefficient of Friction[1] | |
|---|---|---|
| Thickness (Å) | Symmetric/Symetric (control)[2] | Asymmetric/Symmetric[3] |
| 125 | 0.56 | 0.56 |
| 115 | 0.45 | 0.53 |
| 1oo | 0.58 | 0.60 |
| 85 | 0.80[4] | 0.59 |

[1] After 20K contact-start-stop cycles
[2] Prepared as described in Example 2A
[3] Prepared as described in Example 1A
[4] After 4.3K contact-start-stop cycles due to head crash.

Table 1 shows that the coefficient of friction for the two media are similar at overcoat thicknesses of 100 Å or more. However, at a total overcoat thickness of less than 100 Å, e.g., 85 Å, the overcoat prepared with the magnetic means arranged asymmetrically in the first sputtering chamber and symmetrically in the second sputtering chamber, provided protection for 20,000 contact-start-stop cycles and gave an overall lower coefficient of friction of 0.59. For the medium having an overcoat formed with the magnetic means arranged conventionally, or symmetrically, in both sputtering chambers, and a thickness of 85 Å, the head crashed after 4,266 contact-start-stop cycles.

Figure 10A:
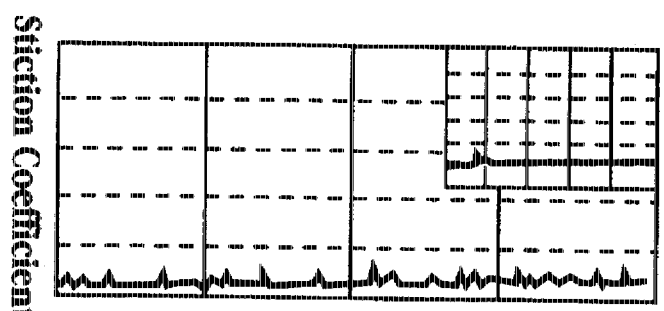
FIGS. 10A–10H show contact start\stop performance at ambient conditions for media having a two-layered overcoat deposited by sputter deposition in two chambers of a sputtering apparatus, with the magnetic means oriented asymmetrically in the first chamber and symmetrically in the second chamber (FIGS. 10A–10D) and with the magnetic means oriented symmetrically in both the first and second sputtering chambers (FIGS. 10E–10H)
Figure 10B:
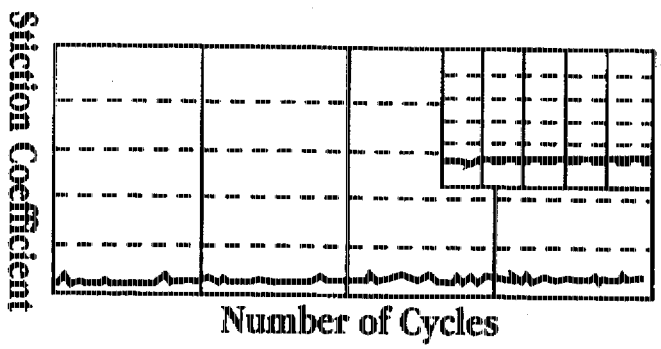
Figure 10C:
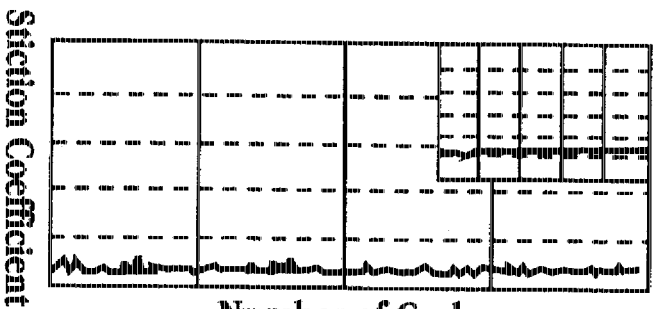
Figure 10D:
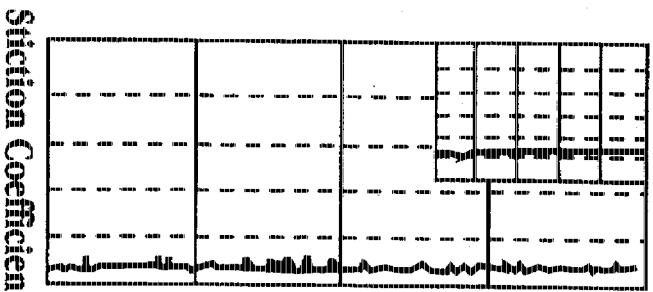
Figure 10E:
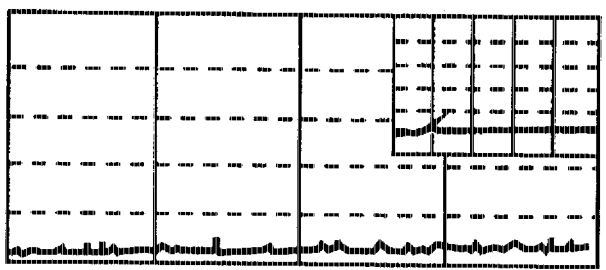
Figure 10F:
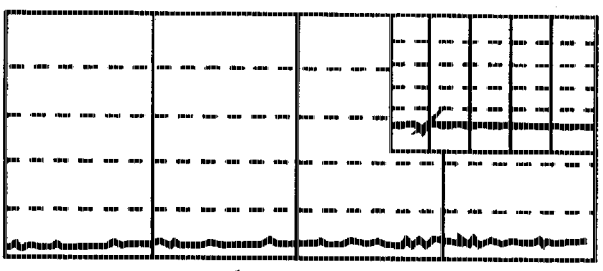
Figure 10G:
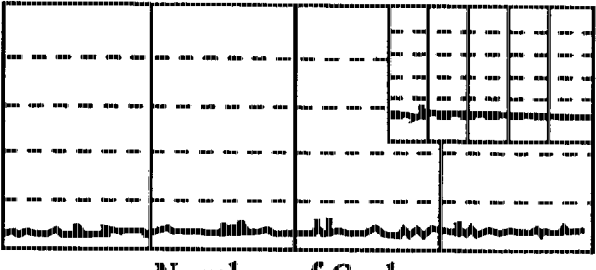
Figure 10H:
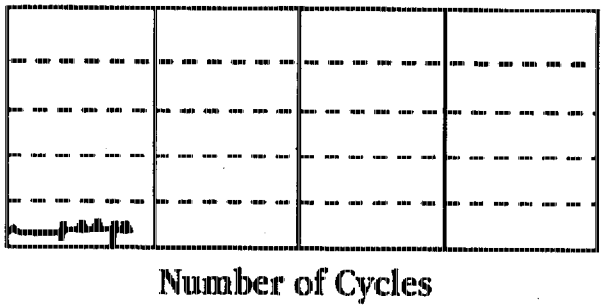

FIGS. 10A-10H show contact-start-stop performance at ambient conditions for the media prepared as described in Examples 1A and 2A. The total overcoat thicknesses of the media were 125 Å (FIGS. 10A and 10E), 115 Å (FIGS. 10B and 10F), 100 Å (FIGS. 10C and 10G) and 85 Å (FIGS. 10D and 10H). The CSS performance of the media are shown in FIG. 10 by plotting stiction against number of contact start-stop cycles. It can be seen in FIGS. 10A-10D that the media prepared in accordance with the invention (Example 1A) have a lower stiction at all overcoat thicknesses, compared to the media formed conventionally (FIGS. 10E-10H, Example 2A). At an overcoat thickness of 85 Å, the overcoat formed in accordance with the invention provided good stiction properties over the 20,000 cycles tested (FIG. 10D), whereas the overcoat prepared with the magnetic means oriented symmetrically (FIG. 10H) was worn away after 4,266 contact start-stop cycles.

Table 2 shows friction coefficients for media prepared as described in Examples 2A and 2B. In Example 2A, the overcoat was deposited by sputtering the two overcoat layers in two sputtering chambers with the magnetic means oriented symmetrically. In Example 2B, the overcoat was deposited by sputtering the two overcoat layers in two sputtering chambers with the magnetic means oriented symmetrically in the first chamber and asymmetrically in the second chamber—that is, oriented oppositely from the orientation preferred for sputtering the first and second overcoat layers in accordance with the invention.

TABLE 2

| Overcoat Thickness (Å) | Coefficient of Friction[1] | |
|---|---|---|
| | Symmetric/Symetric (control)[2] | Asymmetric/Symmetric[3] |
| 190 | 0.54 | 0.95 |
| 165 | 0.81 | 0.58 |
| 145 | 1.01 | 0.60 |
| 125 | 0.72 | 0.54 |

[1]After 20K contact-start-stop cycles
[2]Prepared as described in Example 2A
[3]Prepared as described in Example 2B Table 2 shows that an overcoat formed with the magnetic means oriented symmetrically in the first chamber and asymmetrically in the second sputtering chamber, result in a poorer, e.g., higher, coefficient of friction compared to media prepared with the magnetic means arranged symmetrically in both sputtering chambers.

Magnetic recording media having a carbon overcoat were prepared as described in Examples 1B and 2C. The textured surface of the substrate in these media was smoother than the substrates used in the media described above. (Substrate surface roughnesses are reported in Examples 1A and 1B). Table 3 compares the coefficient of friction of the media having an overcoat of various thickness formed in accordance with the invention and conventionally.

TABLE 3

| Overcoat Thickness (Å) | Coefficient of Friction[1] | |
|---|---|---|
| | Symmetric/Symetric (control)[2] | Asymmetric/Symmetric[3] |
| 115 | 1.54 | 1.15 |
| 100 | 2.49 | 1.55 |
| 85 | 1.40 | 0.65 |

[1]After 20K contact-start-stop cycles
[2]Prepared as described in Example 2C
[3]Prepared as described in Example 1B Table 3 shows that media having an overcoat formed with the magnetic means arranged asymmetrically in the first sputtering chamber and symmetrically in the second sputtering chamber have a lower coefficient of friction at all thicknesses tested than the media formed with a conventional (symmetric/symmetric) magnetic means arrangement. In fact, as the overcoat thickness decreases, the relative improvement in friction coefficient increases. At an overcoat thickness of 115 Å, the medium with the overcoat formed in accordance with the invention had a 34% lower coefficient of friction. At an overcoat thickness of 85 Å, the coefficient of friction for the medium prepared in accordance with the invention was 115% lower that the medium having an overcoat prepared conventionally.

FIGS. 11A–11D show contact start\stop performance at ambient conditions for the media described above with respect to Table 3 (Examples 1B and 2C) at overcoat thicknesses of 115 Å and 100 Å. The media with an overcoat prepared in accordance with the invention (Example 1B, FIGS. 11A–11B) had a lower stiction that the media having an overcoat deposited conventionally (Example 2C, FIGS. 11C–11D).

B. Overcoat Formed in One Chamber Process

In another embodiment, the invention includes an overcoat in a magnetic recording media prepared by sputtering first and second overcoat layers in a single sputtering chamber. The magnetic means in the sputtering chamber are oriented asymmetrically, and the first overcoat is deposited by sputtering under an argon atmosphere. The second overcoat layer is deposited by sputtering under a nitrogen-argon atmosphere. An intermediate overcoat layer is formed between the first and second overcoat layers, as described above with respect to FIGS. 8 and 9.

Figure 12A:
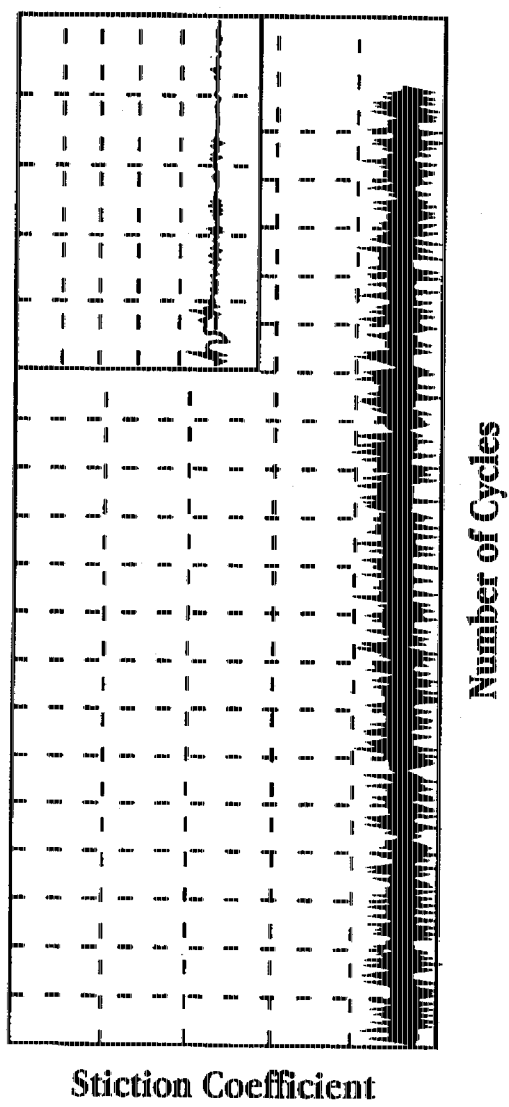
FIGS. 12A–12B show contact start\stop performance at ambient conditions for media having a two-layered overcoat deposited by sputter deposition in a single sputtering chamber, with the magnetic means oriented asymmetrically (FIG. 12A) and symmetrically (FIG. 12B).
Figure 12B:
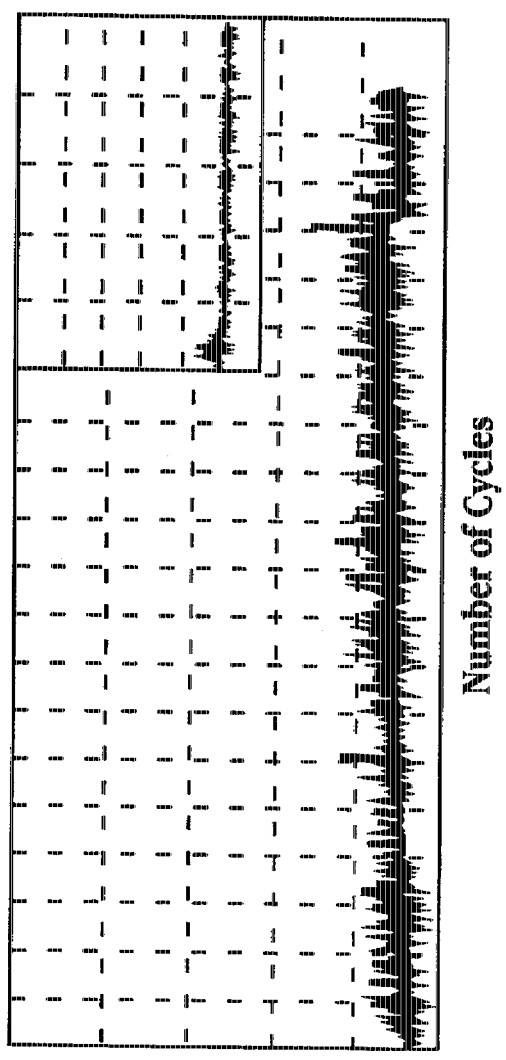

The contact-start-stop performance at ambient conditions for media having a two-layered overcoat deposited by sputter deposition in a single sputtering chamber is shown in FIGS. 12A–12B. FIG. 12A shows that the stiction of the medium prepared as described in Example 3 with the magnetic means oriented asymmetrically is lower compared to the stiction of a medium having an overcoat formed with the magnetic means oriented symmetrically (FIG. 12B).

IV. EXAMPLES

The Examples are intended to illustrate but not limit the scope of the invention.

Example 1A

Preparation of Overcoat in Two Sputtering Chambers: Rough Substrate

Magnetic recording media were prepared by sputtering a chromium underlayer onto a nickel-phosphorus coated aluminum substrate (95 mm×31.5 mil). The substrate surface was textured and characterized by a surface roughness at 1.20 inch radius of 31±4 Å (radial) and 34±5 Å (circumferential).

A magnetic recording layer of CoCrTa (88:8:4) was deposited by sputtering over the chromium underlayer.

A two-layer carbon overcoat was formed by sputtering the first overcoat layer in a first sputtering chamber from a graphite target under an argon atmosphere. The magnetic means in the first chamber were arranged asymmetrically to produce magnetic field lines across the target surfaces and between directly confronting target portions.

The second overcoat layer was deposited in a second sputtering chamber from a graphite target under an atmosphere containing 40 atomic percent nitrogen, balance argon. The magnetic means in the second chamber were arranged symmetrically to produce magnetic field lines across the target surfaces.

A 20 Å thick lubricating layer of perfluoropolyether lubricant was applied to the overcoat.

Dynamic friction coefficients were measured conventionally, under ambient conditions (22° C. and about 45% humidity) with the disc rotating at 3600 RPM and with a 3.5 gram load. Friction coefficients are reported in Table 1 after 20,000 contact start-stop cycles. Contact-start-stop measurements are shown in FIGS. 10A–10D for media having a total overcoat thickness of 125 Å (FIG. 10A), 115 Å (FIG. 10B), 100 Å (FIG. 10C) and 85 Å (FIG. 10D).

Example 1B

Preparation of Overcoat in Two Sputtering Chambers: Smooth Substrate

Magnetic recording media were prepared by sputtering a chromium underlayer onto a nickel-phosphorus coated aluminum substrate (95 mm×31.5 mil). The substrate surface was textured and characterized by a surface roughness at 1.20 inch radius of 24±3 Å (radial) and 27±5 Å (circumferential).

A magnetic recording layer of CoCrTa (84.5:12.5:3) was deposited by sputtering over the chromium underlayer.

A two-layer carbon overcoat was formed as described above in Example 1A. Dynamic friction coefficients are reported in Table 3 and contact-start-stop properties are shown in FIGS. 11A–11B for media having a total overcoat thickness of 115 Å (FIG. 11A) and 100 Å (FIG. 11B).

Example 2A

Preparation of Comparative Media

Magnetic discs were prepared as described in Example 1A, except for formation of the carbon overcoat. The two-layer carbon overcoat was formed by sputtering the first overcoat layer in a first sputtering chamber from a graphite target under an argon atmosphere. The magnetic means in the first chamber were arranged symmetrically to produce magnetic field lines across the target surfaces.

The second overcoat layer was deposited in a second sputtering chamber from a graphite target under an atmosphere containing 40 atomic percent nitrogen, balance argon. The magnetic means in the second chamber were arranged symmetrically to produce magnetic field lines across the target surfaces.

Dynamic friction coefficients are reported in Tables 1 and 2 in the column designated symmetric/symmetric (control) and contact-start-stop properties are shown in FIGS. 10E–10H for media having a total overcoat thickness of 125 Å (FIG. 10E), 115 Å (FIG. 10F), 100 Å (FIG. 10G) and 85 Å (FIG. 10H).

Example 2B

Preparation of Comparative Media

Magnetic discs were prepared as described in Example 1A, except for formation of the carbon overcoat. The two-layer carbon overcoat was formed by sputtering the first overcoat layer in a first sputtering chamber from a graphite target under an argon atmosphere. The magnetic means in the first chamber were arranged symmetrically to produce magnetic field lines across the target surfaces.

The second overcoat layer was deposited in a second sputtering chamber from a graphite target under an atmosphere containing 40 atomic percent nitrogen, balance argon. The magnetic means in the second chamber were arranged asymmetrically to produce magnetic field lines across the target surfaces and between directly confronting target portions.

Dynamic friction coefficients are reported in Table 2 in the column designated symmetric/asymmetric.

Example 2C

Preparation of Comparative Media

Magnetic discs were prepared as described in Example 1B, except for formation of the carbon overcoat. The two-layer carbon overcoat was formed by sputtering the first overcoat layer in a first sputtering chamber from a graphite target under an argon atmosphere. The magnetic means in the first chamber were arranged symmetrically to produce magnetic field lines across the target surfaces.

The second overcoat layer was deposited in a second sputtering chamber from a graphite target under an atmosphere containing 40 atomic percent nitrogen, balance argon. The magnetic means in the second chamber were arranged symmetrically to produce magnetic field lines across the target surfaces.

Figure 11C:
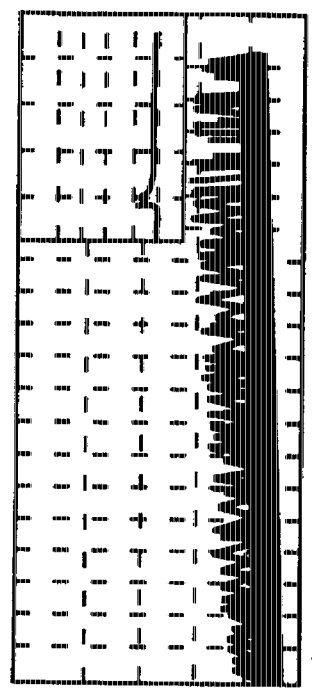
FIGS. 11A–11D show contact start\stop performance at ambient conditions for media having a two-layered overcoat deposited by sputter deposition in two chambers of a sputtering apparatus, with the magnetic means oriented asymmetrically in the first chamber and symmetrically in the second chamber (FIGS. 11A–11B) and with the magnetic means oriented symmetrically in both the first and second sputtering chambers (FIGS. 11C–11D)
Figure 11D:
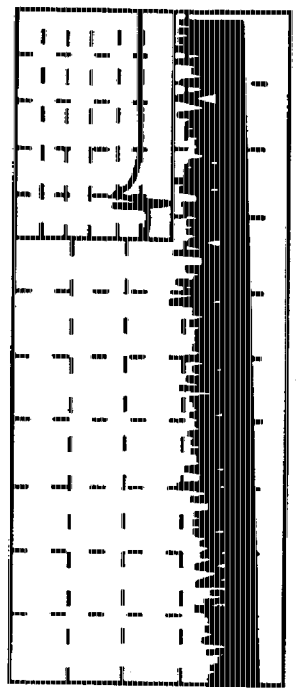
Figure 11A:
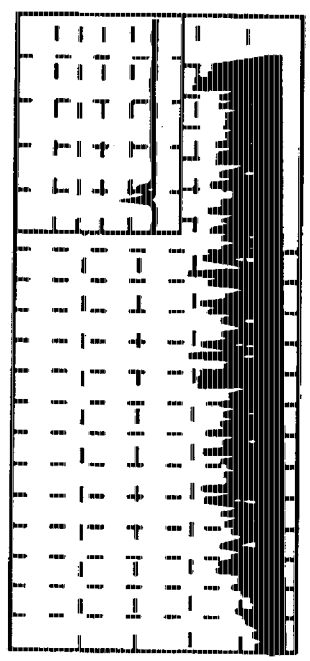
Figure 11B:
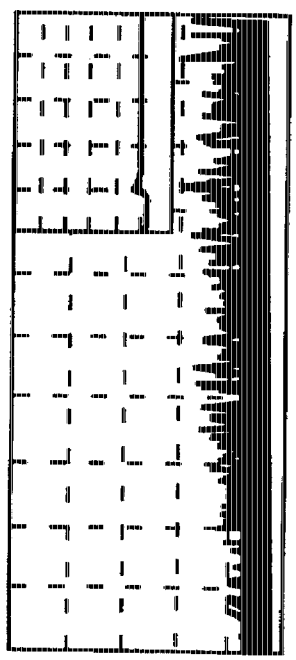

Dynamic friction coefficients are reported in Table 3 in the column designated symmetric/symmetric (control) and contact-start-stop properties are shown in FIGS. 11C–11D for media having a total overcoat thickness of 115 Å (FIG. 11C) and 100 Å (FIG. 11D).

Example 3

Preparation of Overcoat in a Single Sputtering Chamber

Magnetic discs were prepared by sputtering a chromium underlayer on a nickel-phosphorus coated aluminum substrate (95 mm×31.5 mil).

A magnetic recording layer of CoCrTa (88:8:4) was deposited by sputtering over the chromium underlayer.

A carbon overcoat was formed by sputtering the first and second overcoat layers in a single sputtering chamber with the magnetic means in the chamber arranged asymmetrically. The first overcoat layer was deposited from a graphite target under an argon atmosphere. The argon was supplied to the sputtering chamber from an argon supply at a flow of 20 sccm. Deposition of the first overcoat layer continued for 3 seconds.

The second overcoat layer was deposited in the same sputtering chamber after under a nitrogen-containing atmosphere, where the gas was supplied to the chamber at 30 sccm, to achieve a sputtering atmosphere containing 40 atomic percent nitrogen, balance argon.

As described in Example 1A, a lubricating layer was applied to the overcoat.

For comparison, a medium was prepared as described except with the magnetic in the sputtering chamber arranged symmetrically. Dynamic friction coefficients were measured conventionally and are shown in FIGS. 12A (asymmetric magnetic means orientation) and 12B (control, symmetric magnetic means orientation).

Although the invention has been described with respect to particular embodiments, it will be apparent to those skilled in the art that various changes and modifications can be made without departing from the invention.

It is claimed:

1. A method for forming an overcoat having a first carbon overcoat layer and a second nitrogen-containing layer in a magnetic recording medium formed on a substrate, comprising, sputtering said first overcoat layer in a first sputtering chamber having two confronting targets composed of graphite, each target having a magnetic means for confining sputtering plasma during sputtering, and said magnetic means oriented to retain magnetic-field confinement of the sputtering plasma, and to produce magnetic field lines between directly confronting portions of the two targets, and sputtering, under a nitrogen-containing atmosphere, said second nitrogen-containing layer on said first overcoat layer.

2. The method of claim 1, wherein said sputtering of said nitrogen-containing layer occurs in a second sputtering chamber, where said magnetic means are oriented to retain magnetic-field confinement of the sputtering plasma.

3. The method of claim 1, wherein said sputtering of said nitrogen-containing layer occurs in said first sputtering chamber with said magnetic means oriented to retain magnetic-field confinement of the sputtering plasma, and to produce magnetic field lines between directly confronting portions of the two targets.

4. The method of claim 1, wherein said magnetic means are electromagnets, where in said first chamber the electromagnets have magnetic poles on opposite side regions of an associated target, with the polarity of each pole being opposite in confronting target portion.

5. The method of claim 4, wherein said electromagnets have a coil current between 2–5 Amps.

6. The method of claim 1, wherein the magnetic means are permanent magnets.

7. The method of claim 1, wherein said nitrogen-containing sputtering atmosphere is composed of 5–50 atomic percent nitrogen and 50–95 atomic percent argon.

8. The method of claim 1, wherein said sputtering steps are effective to deposit an overcoat having a thickness between 80–250 Å.

* * * * *